United States Patent
Hartzell

[11] 3,738,208
[45] June 12, 1973

[54] SAWMILL APPARATUS HAVING AN IMPROVED LOG CARRIAGE FEED CONTROL

[75] Inventor: James R. Hartzell, Troy, Ohio
[73] Assignee: Hartzell Industries, Inc., Piqua, Ohio
[22] Filed: Mar. 16, 1972
[21] Appl. No.: 235,160

[52] U.S. Cl. .................................. 83/76, 83/403.1
[51] Int. Cl. ........................................... B27b 7/00
[58] Field of Search ..................... 83/403.1, 76, 75, 83/731, 734

[56] References Cited
UNITED STATES PATENTS
2,640,513   6/1953   Watson et al. ................... 83/403.1
2,691,994   10/1954   Ferguson ........................ 83/403.1
3,259,156   7/1966   Pearce ............................ 83/403.1

Primary Examiner—Donald R. Schran
Attorney—William R. Jacox and Alan F. Meckstroth

[57] ABSTRACT

A log transport carriage is supported for linear movement past a motor driven circular saw and is operated by a variable speed hydraulic motor remotely controlled by a valve actuated by a manually operated control lever. The speed of the saw is sensed by a hydraulic pump and governor unit which operates a fluid cylinder positioned adjacent the control lever for automatically and adjustably limiting the maximum speed of the carriage during the cutting of a log so that the saw rotates at a substantially constant speed for producing a precisely uniform flat surface on the log.

11 Claims, 3 Drawing Figures

3,738,208

SAWMILL APPARATUS HAVING AN IMPROVED LOG CARRIAGE FEED CONTROL

BACKGROUND OF THE INVENTION

In a sawmill apparatus for sawing logs into planks or boards, it is common to use a log support carriage such as, for example, the type disclosed in U. S. Pat. No. 3,600,833, which issued to the assignee of the present invention. The carriage is supported by parallel-spaced tracks which extend past a saw husk including a shaft which is usually driven by an electric motor and which supports a large diameter circular saw.

Preferably, the carriage is moved along the tracks by a variable speed hydraulic drive or feed system which is controlled by a sawyer or operator who stands on a platform adjacent a control console. One form of control system includes an upright pivotal lever having a handle member on its upper end and connected at its lower end to a valve which controls the flow of hydraulic fluid from a main supply pump to the hydraulic motor for driving the carriage. By pivoting the lever, the operator variably controls the speed of the carriage in both forward and reverse directions.

It has been found highly desirable to maintain the rotary speed of the circular saw at a substantially constant level during the sawing of a log to produce a precisely uniform and flat surface on the log. For example, the speed of an approximate 40 inch diameter saw is preferably maintained at about 550 r.p.m. when cutting walnut logs to assure a straight uniform cut. The constant saw speed is especially important when the boards are used for producing veneer since the constant velocity of the saw teeth assures a flat surface on the log and thus uniform exposure of the grain.

It is also common for a relatively thin circular saw to have a slightly concave configuration to prevent uncontrolled warping of the blade. When the saw is rotated at approximately 550 r.p.m., it assumes a flat radial condition as a result of the centrifugal forces acting on the saw. However, if the speed of the saw reduces during cutting of a log, the saw tends to return to the slightly concaved condition, resulting in a slight change in the cutting path of the saw teeth.

In attempting to maintain a circular saw at a constant speed during the cutting of a hardwood log such as a walnut log, it has been necessary to employ a highly experienced operator who has a sensitive feel for the actuating lever which controls the speed of the carriage during the feeding of each log into the rotating saw. However, even with an experienced operator, it has been difficult to control the feed of the carriage to assure a constant r.p.m. of the saw, especially when a harder zone of the log rapidly reduces the speed of the saw before the operator can react to reduce the feed of the carriage and the log.

SUMMARY OF THE INVENTION

The present invention is directed to a sawmill log-cutting or sawing apparatus which incorporates an improved control system for feeding or advancing the log support carriage to assure that the saw always operates at a substantially constant speed and thus produces a uniform flat surface on the log with each pass of the carriage. In general, the improved control system is effective to sense the speed of the saw and to adjust automatically and quickly the maximum speed of the log support carriage in response to a slight reduction in the saw speed. The control system is not only automatic and quickly responsive and sensitive, but also is adapted to be conveniently and quickly installed on existing sawmill equipment without significantly modifying the equipment.

In accordance with the illustrated embodiment of the invention, the above features and advantages are generally provided by a control system including a governor unit which incorporates a hydraulic pump and is driven directly from the main support shaft for the circular saw. The speed responsive governor unit controls the output of the hydraulic pump which is connected to a hydraulic cylinder positioned adjacent the pivotal lever which variably controls the speed of the carriage past the saw. The piston rod of the hydraulic cylinder forms an adjustable stop or limit for the carriage speed control lever and effectively controls the movement of the lever in the direction which increases the speed of the carriage. Thus when the saw begins to slow down during the sawing of a log, the governor unit senses the slight decrease of speed and extends the piston of the cylinder to produce a corresponding decrease in the maximum feed rate of the log support carriage.

Other features and advantages of the invention will be apparent from the following description, the accompanying drawings and the appended claims.

DESCRIPTION OF THE PREFERRED EMBODIMENT

Figure 1:
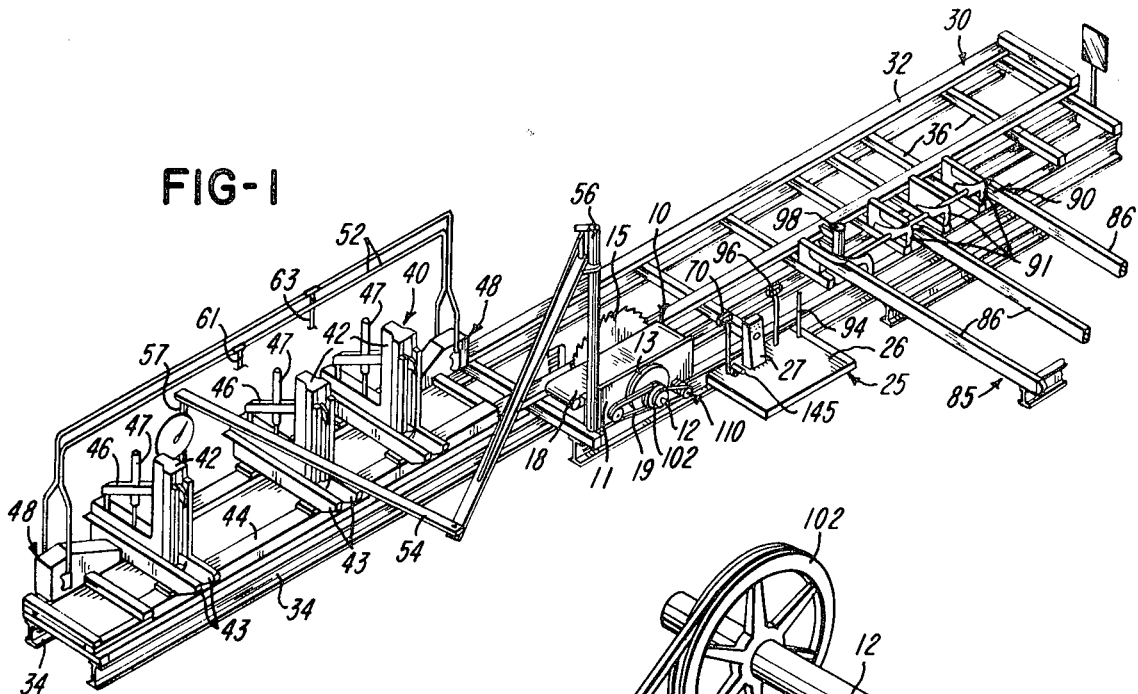
FIG. 1 is a perspective view of sawmill apparatus incorporating a speed-responsive control system constructed in accordance with the present invention.
Figure 2:
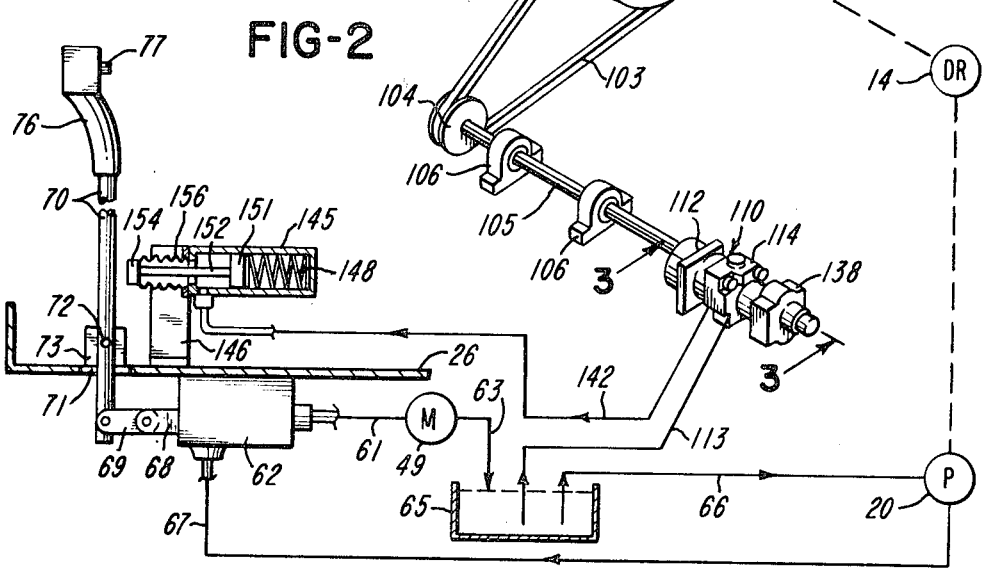
FIG. 2 is a somewhat schematic view of the control system showing some of the components in perspective and other components in section and elevation.

The sawmill equipment or apparatus illustrated in FIG. 1 generally includes a saw husk 10 which consists of the frame 11 supporting bearings for a shaft 12 on which is mounted a multiple V-belt pulley 13. The shaft 12 and pully 13 are driven by an electric motor 14, schematically shown in FIG. 2, located below the frame 12 and providing the shaft 12 with a speed of approximately 550 r.p.m. A circular saw 15 is mounted on the inner end portion of the shaft 12 and has a diameter of about 40 inches. An endless belt conveyor 18 extends around parallel spaced rollers supported by the frame 11, and a multiple V-belt drive 19 connects the shaft 12 to the drive shaft of a main hydraulic pump 20, schematically shown in FIG. 2.

A sawyer's or operator's control station 25 is located adjacent the saw husk 10 and includes a platform 26 on which the operator stands while he operates a series of controls including electrical control switches on a console unit 27. An elongated frame or bed 30 extends past the saw husk 10 and the control station 25 and includes a pair of parallel-spaced tracks 32 each having a rectangular cross-sectional configuration. The tracks 32 are supported by corresponding I-beams 34 which are rigidly connected by a series of cross beams 36.

A log support carriage 40 is supported by the tracks 32 in a manner as disclosed in the above mentioned U.S. Pat. No. 3,600,833 and includes a series of knees 42 which are supported for crosswise movement by corresponding rails 43 mounted on a pair of longitudinally extending frame members 44. The knees 42 are independently adjustable on the rails 43 by corresponding hydraulic cylinders such as disclosed in U. S. Pat. No. 3,086,568 which issued to the assignee of this invention, and each of the knees 42 carries a pivotally supported log-gripping dog 46 actuated by a corresponding hydraulic cylinder 47 in a manner such as disclosed in U. S. Pat. No. 3,079,962 which also issued to the assignee of the present invention.

As disclosed in the above U.S. Pat. No. 3,600,833, the carriage 40 is moved or driven longitudinally along the bed 30 by a set of hydraulic drive units 48 located at opposite ends of the carriage 40. Each of drive units 48 includes a wheel (not shown) enclosing a hydraulic motor 49 (FIG. 2), and the motors 49 are connected by common hydraulic supply and return lines 52 to provide synchronous operation of the motors.

The hydraulic motors and cylinders on the carriage 40 are supplied with hydraulic fluid through corresponding lines which are supported overhead by a pivotal pantograph linkage 54 extending from a column 56 adjacent the saw husk 10 to a column 57 on the carriage 40. The hydraulic fluid lines supported by the linkage 54, include a fluid supply line 61 (FIG. 2) which extends from one of the lines 52 to a control valve 62 mounted on the underneath surface of the platform 26. A return line 63 (FIG. 2) connects the other line 52 to a hydraulic fluid reservoir tank 65 which supplies hydraulic fluid to the motor 20 through a line 66.

A hydraulic fluid supply line 67 extends from the main pump 20 to the control valve 62, and the rate of flow of fluid through the valve 62 to the motors 49 is controlled by an actuator 68 pivotally connected by a link 69 to the lower end portion of a control lever 70. The control lever 70 projects upwardly through a slot 71 within the platform 26 and is pivotally supported by a cross pin 72 which extends between two parallel spaced flanges 73 secured to the platform 26. A handle member 76 forms the upper end portion of the control lever 70 and supports a plurality of push button switches 77 which control independently the cross movement of the knees 42 and the log gripping dogs 46 on the carriage 40. When the operator standing on the platform 26 pulls the handle member 76 towards him (clockwise in FIG. 2), the flow rate of hydraulic fluid through the valve 62 progressively increases causing a corresponding increase in the speed of the hydraulic motors 49 within the drive units 48 of the carriage 40.

Logs are loaded onto the rails 43 of the carriage 40 at a loading station defined by a log support deck 85 including a series of log support rails 86. Endless feed chains (not shown) are mounted on the rails 86 for advancing each log laterally to a log stop and transfer mechanism 90 constructed generally as shown in U. S. Pat. No. 3,584,726 which issued to the assignee of the present invention. The log transfer mechanism 90 includes a plurality of spaced stop and transfer members 91 which are actuated by hydraulic cylinders controlled by a valve (not shown) located under the platform 26 and operated by a lever 94 pivotally supported by the platform 26. Another control lever 96, which is supported by the platform 26 for universal pivoting movement, operates the vertical and lateral movement of a log turner device 98 located adjacent the path of the carriage 40 between two of the log stop and transfer members 91.

Figure 3:
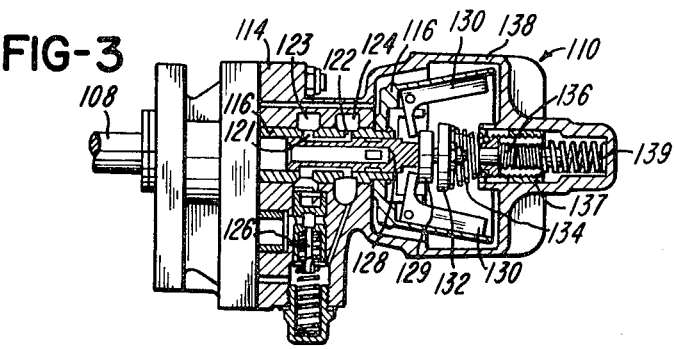
FIG. 3 is a part sectional view of the governor unit as taken generally on the line 3—3 of FIG. 2.

In accordance with the present invention, the saw support shaft 12 also supports a pulley 102 (FIGS. 1 and 2) which is connected by a V-belt 103 to a smaller diameter pulley 104 mounted on one end portion of a shaft 105 rotatably supported by a pair of bearings 106 mounted on the frame 11. The pulley 102 has a diameter which is approximately five times the diameter of the pulley 104 so that the shaft 105 rotates at a speed of about five times the speed of the main saw support 12 or at a speed of about 2,750 r.p.m. The shaft 105 is coupled to the shaft 108 of a hydraulic governor unit (FIGS. 2 and 3) of the type frequently used on aircraft, for example, in a manner as disclosed in U. S. Pat. No. 3,485,222 which issued to the assignee of the present invention.

The governor unit 110 includes a hydraulic gear pump 112 having an inlet connected by a supply line 113 to the reservoir tank 65. The pump 112 is constructed in a conventional manner with a pair of intermeshing gears or pinions (not shown), one of which is driven by the shaft 108. A housing 114 is secured to the gear pump 112 by a series of screws and defines a chamber which receives a cup-like rotor 116 mounted on a tubular extension 118 of the shaft 108. Axially spaced ports 121 and 122 are formed within the shaft extension 118 and connect with corresponding surrounding chambers 123 and 124. The chamber 123 is connected to the outlet of the gear pump 112 through a pressure responsive valve 126 which provides for recirculation of the fluid within the pump 112 at a preselected pressure.

A spool-type valve member 128 is slidably disposed within the shaft extension 118 and supports a collar 129 which is engaged by a set of L-shaped weight bars 130 pivotally supported by the cup-shaped rotor 116. An anti-friction bearing 132 is mounted on the outer end portion of the valve member 128, and a compression coil spring 134 extends from the outer race of the bearing 132 to a plug 136 threaded into a sleeve 137 slidably disposed within a bore of a cap member 138 secured to the housing 114. The plug 136 and sleeve 137 are adjustable against the bias of a compression coil spring 139 by an adjustment mechanism (not shown) which provides for selecting the extent of movement of the weight bars 130 and valve member 128 in response to rotation of the shaft 108.

The outlet portion 122 and its surrounding corresponding chamber 124 are connected by a line 142 (FIG. 2) to one end of a hydraulic cylinder 145 which is supported by bracket 146 mounted on the platform 26 adjacent the carriage speed control lever 70. The hydraulic cylinder 145 encloses a compression coil spring 148 which extends between one end of the cylinder 145 and a slidable piston 151. A piston rod 152 extends from the piston 151 and supports a stop member 154 which is positioned within the pivotal path of the control lever 70. A flexible bellows 156 extends between the cylinder 145 and the stop member 154 to shield the rod 152 and cylinder 145 from a collection of sawdust and other wood particles.

The control system of the invention operates in the following manner. After a log has been loaded onto the carriage 40, the operator advances the carriage 40 by pulling lightly on the handle member 76 of the control lever 70 so that the log is fed longitudinally into the circular saw 15. Whenever the speed of the saw begins to drop as a result of the saw teeth engaging a harder zone of the log or as a result of initially feeding the log too fast, the slight decrease in speed of the saw shaft 12 is quickly sensed by the governor unit 110 which immediately decreases the pressure of the hydraulic fluid within the line 142. A reduction in pressure on the forward side of the piston 151 causes the compression spring 148 to extend the stop member 154 so that the control lever 70 is pivoted in a counterclockwise direction (FIG. 2) or away from the operator to cause a reduction in the flow rate of fluid to the hydraulic drive motors 49 for the carriage 40. This automatic control of the maximum feed rate of the carriage 40 assures that the circular saw 15 rotates at a substantially constant speed as it cuts through the log.

From the drawing and the above description, it is apparent that a sawmill apparatus incorporating a carriage feed control system constructed in accordance with the present invention, provides desirable features and advantages. For example, the control system provides for quickly sensing slight reductions in the speed of the saw 15 and automatically produces an immediate reduction in the feed of the log support carriage 40. Furthermore, the hydraulic governor unit 110 may be conveniently and precisely adjusted by axially adjusting the sleeve 137 so that each log is fed at a rate which provides for optimum cutting efficiency and for producing a uniform flat surface on the log. It is also apparent that the hydraulic governor unit 110 and the hydraulic actuating cylinder 145 may be conveniently and quickly installed on existing sawmill apparatus or equipment.

While the form of sawmill apparatus and control system herein described constitutes a preferred embodiment of the invention, it is to be understood that the invention is not limited to this precise form of apparatus, and that changes may be made therein without departing from the scope and spirit of the invention. For example, the control system may be used in conjunction with log support carriages which are reciprocated or operated by other drive means such as a power driven winch and cable device or an elongated fluid cylinder or a slip belt-type drive wherein the cylinder 145 would actuate an idler pulley and control the tension in the drive belts. The control system may also be used with other forms of control mechanisms for advancing and retracting the carriages, and it is also apparent that the cylinder 145 may be of the double acting type or be spring retracted or may be constructed as an integral part of the control valve 62.

The invention having thus been described, the following is claimed:

1. In a sawmill apparatus adapted for cutting logs into planks and the like, and including a rotatively driven cutter, a carriage having means for supporting a log, means supporting said carriage for linear movement along a path adjacent said cutter, variable speed drive means for moving said carriage along said path to feed the log longitudinally into said cutter, and means for controlling said variable speed drive means to vary the rate at which the log is fed into said cutter, the improvement comprising means for sensing the speed of rotation of said cutter, and means for variably limiting the operation of said controlling means and the feed of said carriage in response to actuation of said sensing means to effect rotation of said cutter at a substantially constant predetermined speed during the cutting of the log for producing a uniform flat surface on the log.

2. Sawmill apparatus as defined in claim 1 wherein said speed sensing means and said limiting means are fluid actuated.

3. Sawmill apparatus as defined in claim 1 wherein said controlling means includes a manually operable lever, and said limiting means is effective to limit the movement of said lever when operated to increase the speed of said carriage.

4. Sawmill apparatus as defined in claim 1 wherein said sensing means comprises a governor operated at a speed substantially faster than the speed of said cutter.

5. Sawmill apparatus as defined in claim 4 wherein said sensing means further includes a fluid pump, and valve means actuated by said governor and positioned to control the output of said pump.

6. In a sawmill apparatus adapted for cutting logs into planks and the like, and including a rotatively driven shaft supporting a cutter, a carriage having means for supporting a log, track means supporting said carriage for linear movement along a path adjacent said cutter, variable speed drive means for moving said carriage along said path to feed the log longitudinally into said cutter, and means for manually controlling said variable speed drive means to vary the rate at which the log is fed into said cutter, the improvement comprising governor means connected to said shaft for sensing the speed of rotation of said cutter, and fluid actuated means for limiting the operation of said controlling means in response to actuation of said governor means to effect rotation of said cutter at a substantially constant predetermined speed during the cutting of the log for producing a uniform flat surface on the log.

7. Sawmill apparatus as defined in claim 6 wherein said governor means include a hydraulic pump having a shaft, drive means connecting said shaft of said pump to said shaft supporting said cutter to effect simultaneous rotation of said shafts, valve means for controlling the output of said pump, and weight means supported for rotation with said shaft of said pump and connected to actuate said valve means in response to changes in the rotational speed of said shaft of said pump.

8. Sawmill apparatus as defined in claim 7 wherein said drive means connecting said shaft of said pump to said shaft supporting said cutter is effective to rotate said shaft of said pump at a speed substantially faster than the speed of rotation of said shaft supporting said cutter.

9. Sawmill apparatus as defined in claim 6 wherein said controlling means comprises a fluid valve connected to said fluid said drive means for said carriage, a pivotal control lever connected to actuate said valve, and said fluid actuated means comprise a fluid cylinder positioned to provide a variable stop for limiting the pivotal movement of said control lever.

10. Sawmill apparatus as defined in claim 9 including a platform for supporting an operator adjacent said control lever, and means mounted on said platform and supporting said fluid cylinder above said platform in the pivotal path of said control lever.

11. In a sawmill apparatus adapted for cutting logs into planks and the like, and including a rotatively driven shaft supporting a cutter, a carriage having means for supporting a log, track means supporting said carriage for linear movement along a path adjacent said cutter, variable speed fluid drive means for moving said carriage along said path to feed the log longitudinally into said cutter, and a manually operated valve for controlling the flow of fluid to said variable speed drive means to vary the rate at which the log is fed into said cutter, the improvement comprising a hydraulic pump and governor unit having a shaft driven by said shaft supporting said cutter for sensing the speed of rotation of said cutter, a fluid actuated cylinder positioned to limit the operation of said manually operated valve, and means connecting said pump and governor unit to said cylinder for controlling the actuation of said cylinder in response to operation of said pump and governor unit to effect rotation of said cutter at a substantially constant predetermined speed during the cutting of the log for producing a uniform flat surface on the log.

* * * * *